US012233428B2

(12) United States Patent
Yamada

(10) Patent No.: US 12,233,428 B2
(45) Date of Patent: Feb. 25, 2025

(54) DISPENSER

(71) Applicant: Kao Corporation, Tokyo (JP)

(72) Inventor: Takashi Yamada, Machida (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 17/762,660

(22) PCT Filed: Jul. 17, 2020

(86) PCT No.: PCT/JP2020/027976
§ 371 (c)(1),
(2) Date: Mar. 22, 2022

(87) PCT Pub. No.: WO2021/059697
PCT Pub. Date: Apr. 1, 2021

(65) Prior Publication Data

US 2022/0331823 A1 Oct. 20, 2022

(30) Foreign Application Priority Data

Sep. 25, 2019 (JP) ................................ 2019-174810

(51) Int. Cl.
*B05B 11/10* (2023.01)
*B05B 11/00* (2023.01)

(52) U.S. Cl.
CPC ...... *B05B 11/1032* (2023.01); *B05B 11/0064* (2013.01)

(58) Field of Classification Search
CPC ............. B05B 11/1032; B05B 11/1035; B05B 11/1036; B05B 11/0064
See application file for complete search history.

(56) References Cited

U.S. PATENT DOCUMENTS 2,275,666 A * 3/1942 Wilson .................... B05B 11/06 239/362
2,709,025 A * 5/1955 Willard ................. G01F 11/025 222/341

(Continued)

FOREIGN PATENT DOCUMENTS

CN 102102655 A 6/2011
EP 0 776 705 A1 6/1997

(Continued)

OTHER PUBLICATIONS

International Search Report mailed on Aug. 25, 2020 in PCT/JP2020/027976 filed on Jul. 17, 2020, 3 pages.

(Continued)

*Primary Examiner* — Paul R Durand
*Assistant Examiner* — Randall A Gruby
(74) *Attorney, Agent, or Firm* — Oblon, McClelland, Maier & Neustadt, L.L.P.

(57) ABSTRACT

A dispenser, which has a pump chamber formed by a body including a depression, and a lid body covering an opening of the body, where a liquid in the pump chamber is discharged from a nozzle portion by performing a discharge operation that presses the lid body to an inside of the pump chamber to deform the lid body, and a liquid is caused to flow into the pump chamber by releasing the discharge operation. The dispenser includes a pressing support portion disposed to face away from a top surface of the lid body, and a discharge operation is performed by pinching a top portion of the lid body and the pressing support portion with fingers from lateral sides of the body.

15 Claims, 11 Drawing Sheets

(56) References Cited

U.S. PATENT DOCUMENTS 2,772,817 A * 12/1956 Jauch .......... F04B 43/08 55/432
2,814,419 A * 11/1957 Lipman .......... F04B 43/0063 222/207
2,884,164 A * 4/1959 Kleid .......... B05B 11/1032 222/207
2,888,034 A * 5/1959 Glegg .......... F04B 53/1092 251/902
3,160,329 A * 12/1964 Radic .......... A45D 40/00 137/859
3,162,333 A * 12/1964 Davidson .......... B05B 11/1032 222/536
3,220,611 A * 11/1965 Zander .......... A47K 5/1208 222/105
3,485,419 A * 12/1969 Taylor .......... G01F 11/025 222/340
3,602,387 A * 8/1971 Patnaude .......... B67D 1/08 417/478
3,715,060 A * 2/1973 Benson .......... F04B 53/1092 222/215
3,907,206 A * 9/1975 Kondo .......... B05B 11/06 239/357
3,952,924 A * 4/1976 Benson .......... A47K 5/1208 222/181.2
3,987,938 A * 10/1976 Cooprider .......... F04B 43/0063 222/211
4,330,071 A * 5/1982 Ohlson .......... B05B 11/1064 222/207
4,561,571 A * 12/1985 Chen .......... A47K 5/1208 222/207
4,880,161 A * 11/1989 Wright .......... B05B 11/1032 222/190
5,076,322 A * 12/1991 Choksi .......... G05D 16/065 137/505.38
5,356,038 A * 10/1994 Banks .......... B65D 35/40 222/105
5,388,572 A * 2/1995 Mulhauser .......... B05B 11/061 128/204.13
5,390,822 A * 2/1995 Lataix .......... G01F 11/082 222/30
5,697,525 A * 12/1997 O'Reilly .......... G01F 11/08 222/105
6,092,695 A * 7/2000 Loeffler .......... B01L 3/0296 137/859
6,158,620 A * 12/2000 Polan .......... B65D 1/0292 222/107
6,216,916 B1 * 4/2001 Maddox .......... A47K 5/1207 222/105
6,752,295 B2 * 6/2004 Weber .......... B05B 11/1032 222/207
6,789,354 B2 * 9/2004 Wells .......... A01G 7/06 47/48.5
7,434,710 B2 * 10/2008 Spriegel .......... A47K 5/1208 92/36
7,501,283 B2 * 3/2009 Hersch .......... G01F 11/021 422/562
7,806,301 B1 * 10/2010 Ciavarella .......... A47K 5/1208 222/207
7,931,173 B2 * 4/2011 Yuan .......... B05B 11/1036 222/476
8,348,104 B2 * 1/2013 Py .......... B67D 1/02 222/105
8,353,428 B2 * 1/2013 Pritchard .......... B67D 3/0045 222/105
8,360,287 B2 * 1/2013 Ciavarella .......... A47K 5/1208 239/338
8,459,509 B2 * 6/2013 Bui .......... G01F 11/08 222/207
8,579,159 B2 * 11/2013 Ciavarella .......... B05B 11/1067 222/190
8,640,926 B2 * 2/2014 McNulty .......... A47K 5/1208 222/105
8,899,449 B2 * 12/2014 Daansen .......... F16K 47/08 222/212
8,991,648 B2 * 3/2015 Smith .......... B05B 11/103 222/1
8,998,591 B2 * 4/2015 Han de Man .......... A47K 5/1208 137/625.5
9,072,411 B2 * 7/2015 Corney .......... A47K 5/1204
9,283,582 B2 * 3/2016 Han De Man .......... B05B 11/007
9,517,484 B2 * 12/2016 Ciavarella .......... F04B 43/04
9,714,714 B2 * 7/2017 Daansen .......... B05B 11/007
10,226,783 B2 * 3/2019 Han De Man .......... B05B 11/0067
10,671,100 B2 * 6/2020 Bock .......... B23K 26/24
10,690,256 B2 * 6/2020 Bock .......... G05D 16/0658
10,782,712 B2 * 9/2020 Bock .......... B29C 65/16
10,844,761 B2 * 11/2020 Bock .......... F16K 17/0453
11,169,549 B2 * 11/2021 Bock .......... B23K 26/323
11,409,310 B2 * 8/2022 Bock .......... B23K 26/28
2002/0074359 A1 * 6/2002 Weber .......... B05B 11/1032 222/209
2005/0087555 A1 * 4/2005 Hatton .......... A47K 5/1208 222/494
2005/0247737 A1 * 11/2005 Armstrong .......... A47K 5/1202 222/325
2006/0049208 A1 * 3/2006 Daansen .......... B65D 47/2031 222/212
2007/0272710 A1 * 11/2007 Bui .......... B01L 3/0265 222/207
2008/0035677 A1 2/2008 Daansen
2008/0156829 A1 * 7/2008 Chen .......... A47K 5/1207 222/207
2009/0071977 A1 3/2009 Abe
2010/0252577 A1 10/2010 Neuhaus
2011/0031278 A1 * 2/2011 Han de Man .......... B05B 11/1033 222/207
2011/0174397 A1 * 7/2011 Goerlich .......... F01M 13/0011 137/535
2012/0014824 A1 * 1/2012 Han de Man .......... A47K 5/1208 417/472
2012/0097709 A1 * 4/2012 Han de Man .......... B05B 11/1016 222/207
2015/0034678 A1 * 2/2015 Banks .......... B05B 7/0025 222/190
2015/0048121 A1 * 2/2015 Daansen .......... F16K 3/28 222/212
2015/0260179 A1 * 9/2015 Hatton .......... B05B 11/007 417/395
2022/0055052 A1 * 2/2022 Uehara .......... B05B 11/007
2022/0097088 A1 * 3/2022 Yamada .......... B05B 11/007
2022/0331823 A1 * 10/2022 Yamada .......... F04B 9/14
2022/0412335 A1 * 12/2022 Yamada .......... B05B 11/103

FOREIGN PATENT DOCUMENTS

EP 2 559 492 A1 2/2013
FR 439 045 A 1/1912
GB 705302 A 3/1964
GB 1 495 100 12/1977
GB 2.033470 A 5/1980
JP 6-92383 A 4/1994
JP 6-330859 A 11/1994
JP 2001-158462 A 6/2001
JP 2001-180728 A 7/2001
JP 2003-012065 A 1/2003
JP 2005-36775 A 2/2005
JP 2007-509827 A 4/2007
JP 2012-066849 A 4/2012
JP 2012-522184 A 9/2012
KR 20-0347812 Y1 4/2004
TW 200932369 A 8/2009
TW 201020030 A 6/2010

(56) References Cited

FOREIGN PATENT DOCUMENTS

| | | | | | |
|---|---|---|---|---|---|
| WO | WO 2017/109665 | A1 | | 6/2017 | |
| WO | WO-2017091091 | A1 | * | 6/2017 | ......... B05B 11/3008 |

OTHER PUBLICATIONS

U.S. Appl. No. 17/762,672, filed Mar. 22, 2022, Takashi Yamada.
Extended European Search Report issued Sep. 14, 2023 in European Patent Application No. 20867276.6, 4 pages.

* cited by examiner

DISPENSER

TECHNICAL FIELD

The present invention relates to a dispenser.

BACKGROUND ART

Patent Literature 1 describes a pump in which a pump chamber is formed inside a wall body that is contractable and restorable, and discharge is ejected from a nozzle connected to the pump chamber via a discharge valve by performing a discharge operation that crushes the wall body toward the pump chamber to cause the wall body to contract.

CITATION LIST

Patent Literature

Patent Literature 1: US2009071977(A1)

SUMMARY OF INVENTION

The present invention relates to a dispenser in which a pump chamber is formed by a body including a depression, and a lid body covering an opening of the body, a liquid in the pump chamber is discharged from a nozzle portion by performing a discharge operation that presses the lid body to an inside of the pump chamber to deform the lid body, and a liquid is caused to flow into the pump chamber by releasing the discharge operation. The dispenser of the present invention includes a pressing support portion that is disposed to face away from a top surface of the lid body, and the discharge operation is performed by pinching a top portion of the lid body and the pressing support portion with fingers from lateral sides of the body.

DESCRIPTION OF EMBODIMENTS

In Patent Literature 1, when performing a discharge operation of crushing a spherical wall portion to cause the wall portion to contract, it is likely that the wall portion is wrapped with an entire palm and crushed, or the wall portion is pinched and crushed with fingers. However, when pinching and crushing the wall portion with fingers, the position of the fingers may deviate depending on the deformation direction of the wall portion, and the discharge operation may not be sufficiently performed.

The present invention relates to a dispenser that can eliminate the disadvantages of the aforementioned conventional art.

Hereinafter, the present invention will be described based on preferable embodiments with reference to the drawings.

First Embodiment

Figure 1:
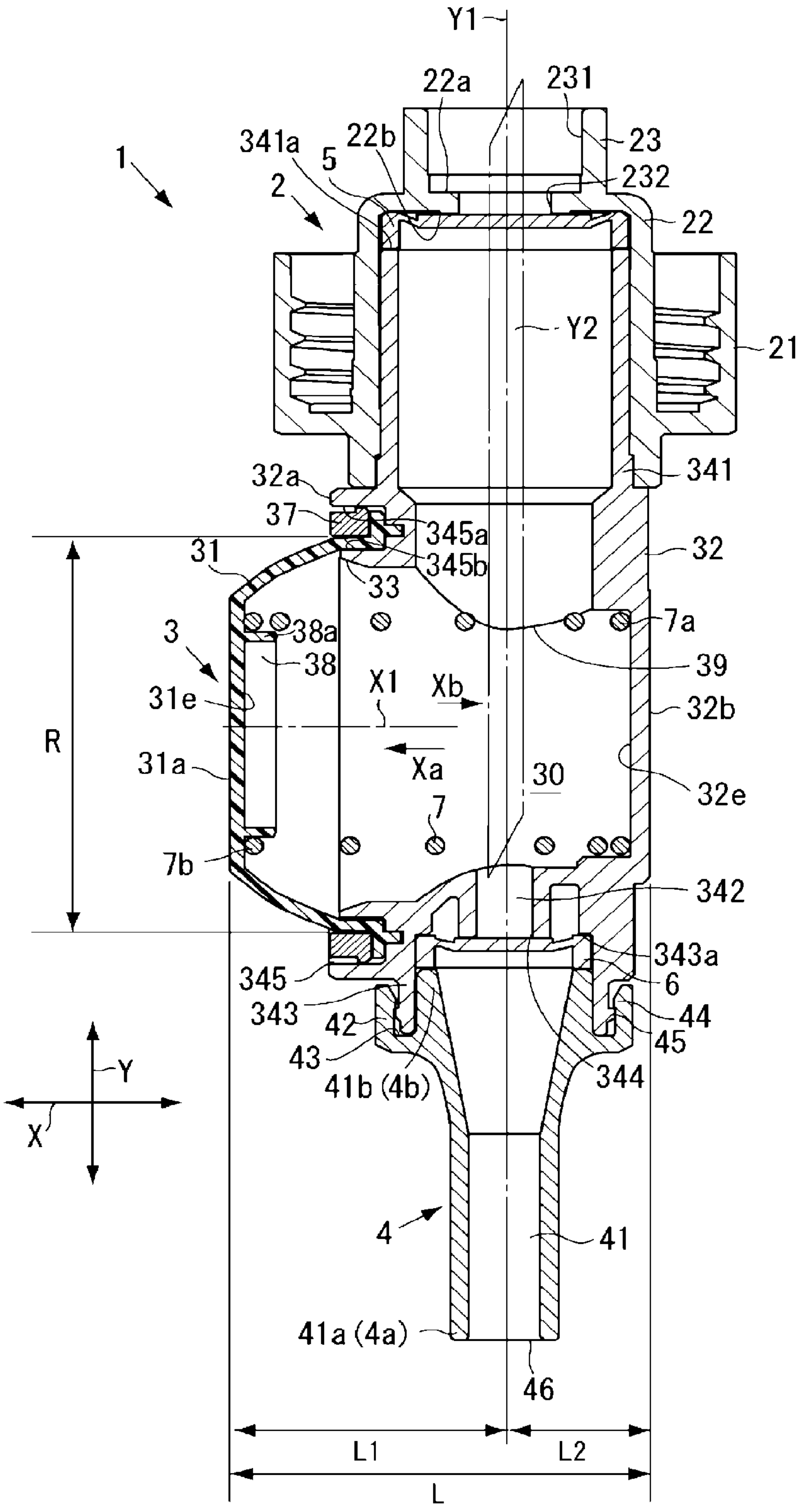
FIG. 1 is a sectional view explaining a configuration and a state before a discharge operation of a dispenser according to a first embodiment of the present invention.
Figure 2:
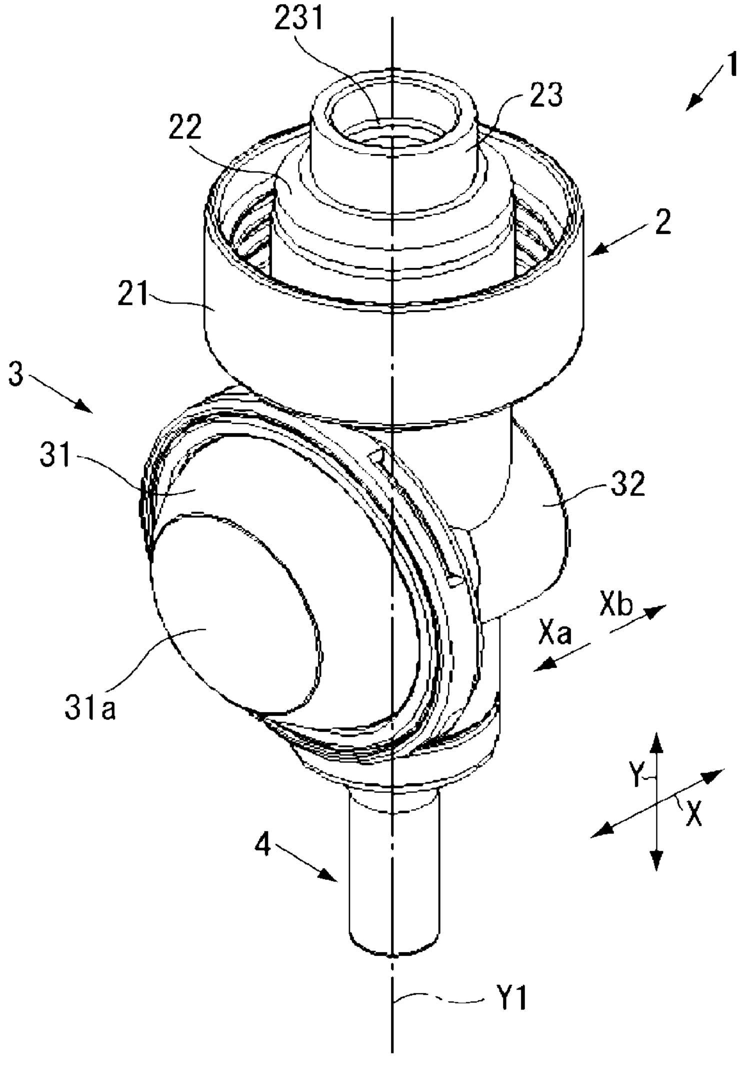
FIG. 2 is a perspective view explaining the configuration of the dispenser according to the first embodiment.
Figure 3:
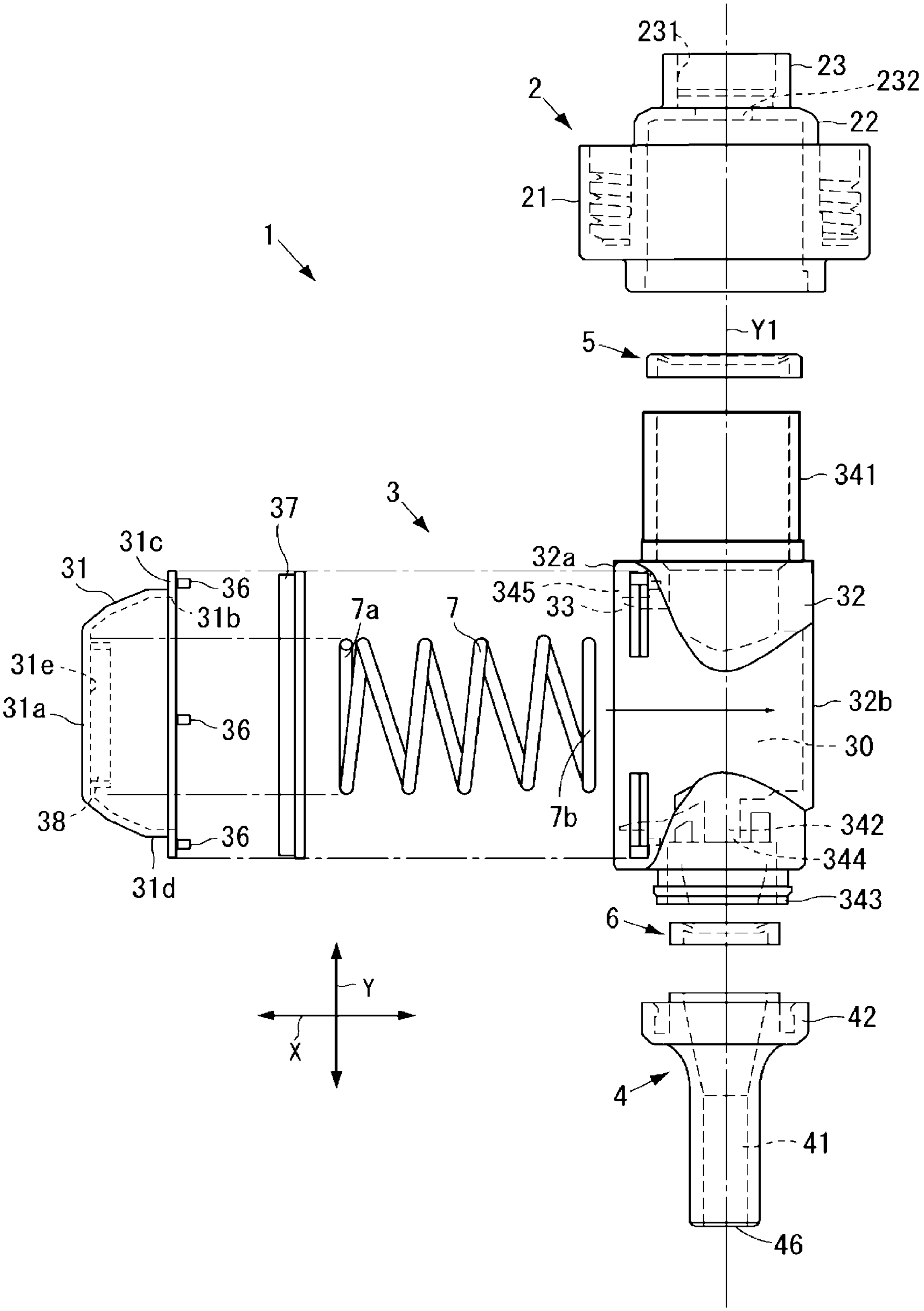
FIG. 3 is an exploded view explaining the configuration of the dispenser according to the first embodiment.
Figure 5:
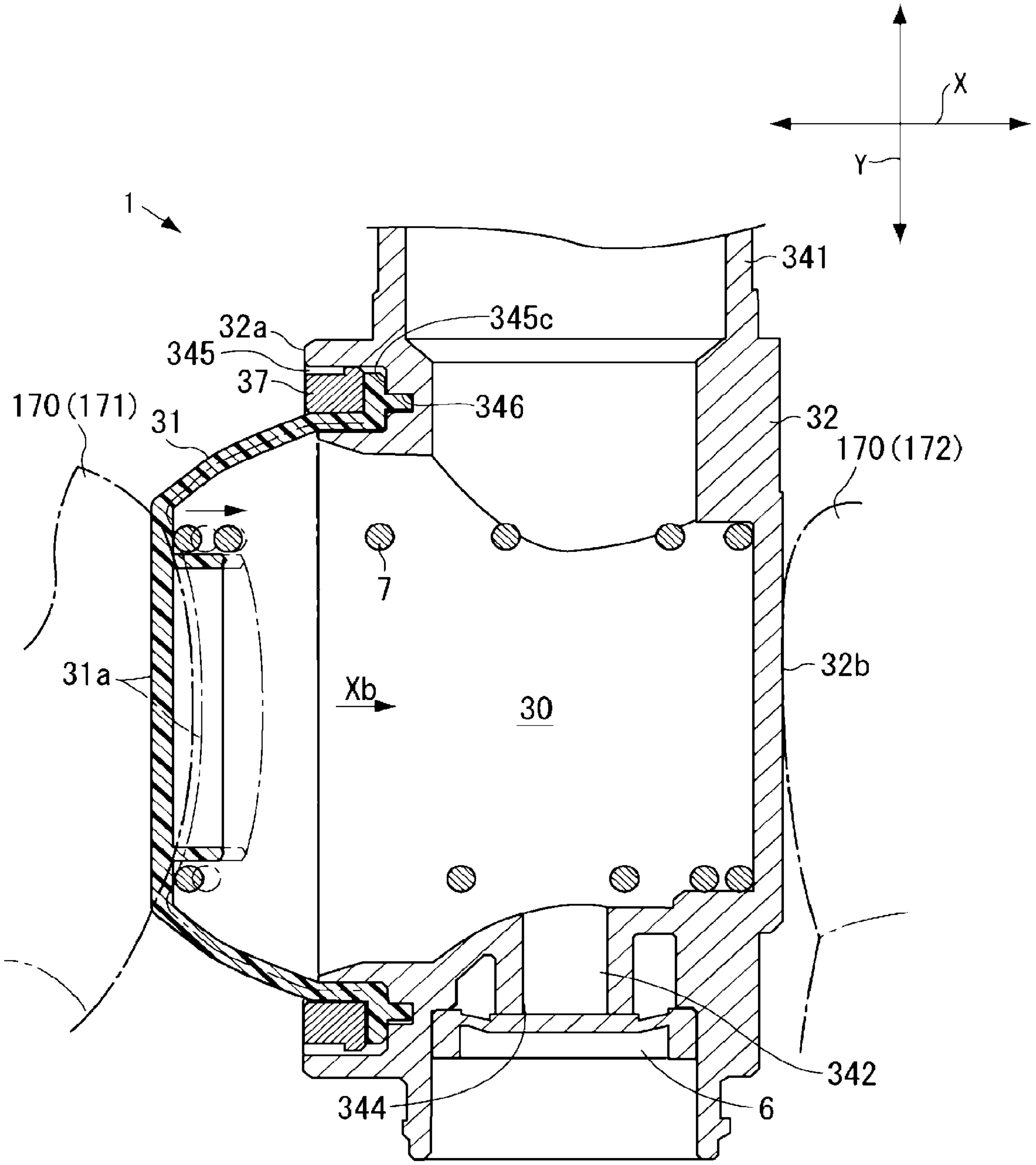
FIG. 5 is a sectional view showing an initial state of the discharge operation of the dispenser according to the first embodiment.
Figure 6:
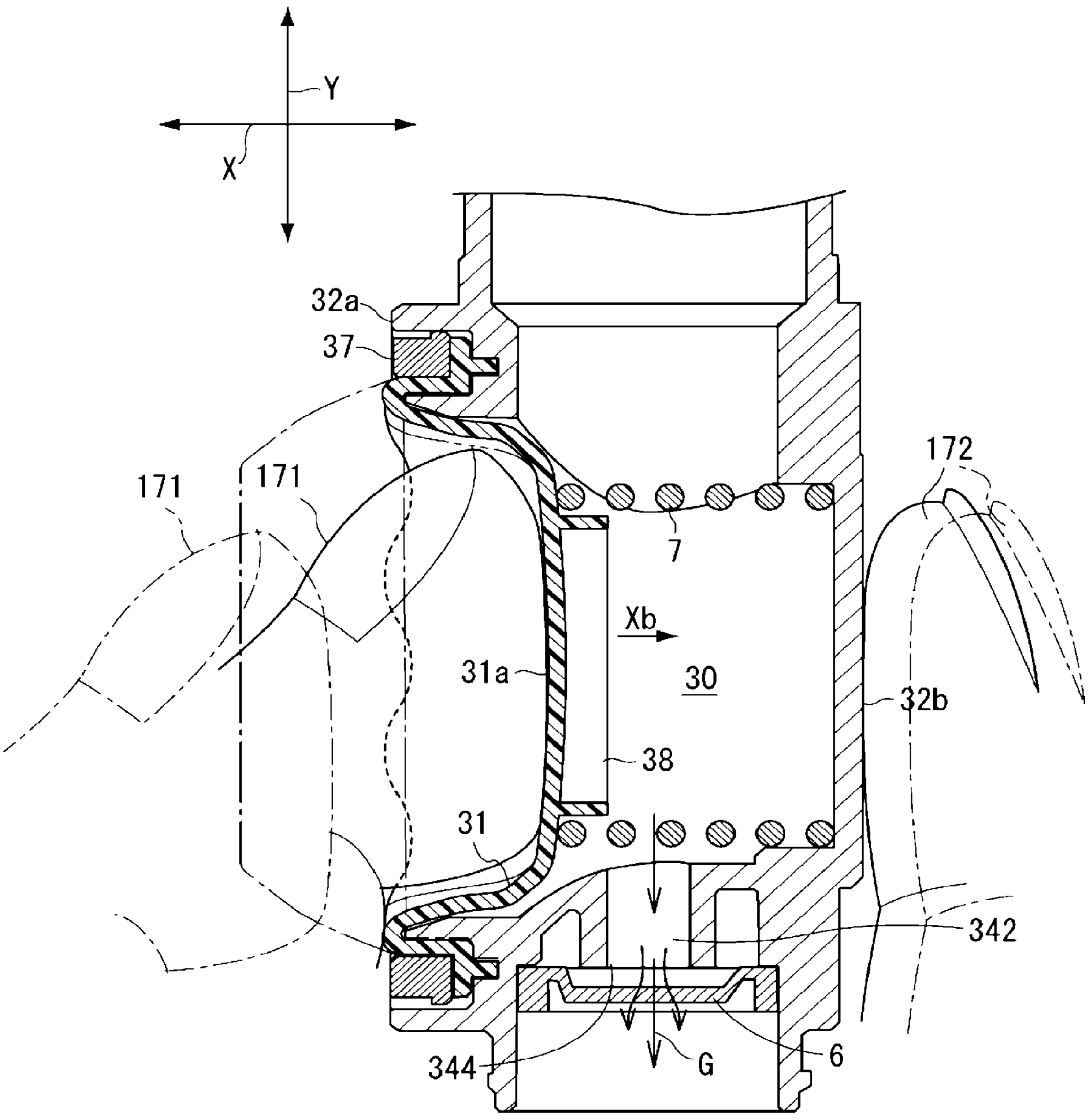
FIG. 6 is a sectional view showing a state after the discharge operation of the dispenser according to the first embodiment.

A dispenser 1 according to a first embodiment of the present invention includes a cap portion 2, a pump portion 3, and a nozzle portion 4 as shown in FIG. 1 to FIG. 3. FIG. 1 and FIG. 2 show states before a discharge operation of the dispenser 1. FIG. 5 and FIG. 6 show states after starting the discharge operation of the dispenser 1, FIG. 5 shows a state directly after start of the operation, and FIG. 6 shows a state after the discharge operation. "Before the discharge operation" refers to a state before performing a discharge operation to the dispenser 1, and "after the discharge operation" refers to a state after the discharge operation is performed to the dispenser 1. FIG. 3 is an exploded view explaining a configuration of the dispenser 1.

The pump portion 3 includes a lid body 31, and a casing 32 as a body that has a depression 39 inside and has the lid body 31 fitted thereto. The pump portion 3 is formed as a pump chamber 30 by the lid body 31 and the casing 32. The casing 32 is made of a resin and forms a substantially bottomed cylindrical shape. In the casing 32, an opening 33 is formed in one end surface **32*a* in an axial direction X. In the present embodiment, the axial direction X corresponds to a pressurization direction at the time of performing the discharge operation, and a diameter direction Y corresponds to a diameter direction of the lid body 31 and the pump portion 3 when the pump portion 3 is seen from a lid body 31** side.

Figure 4:
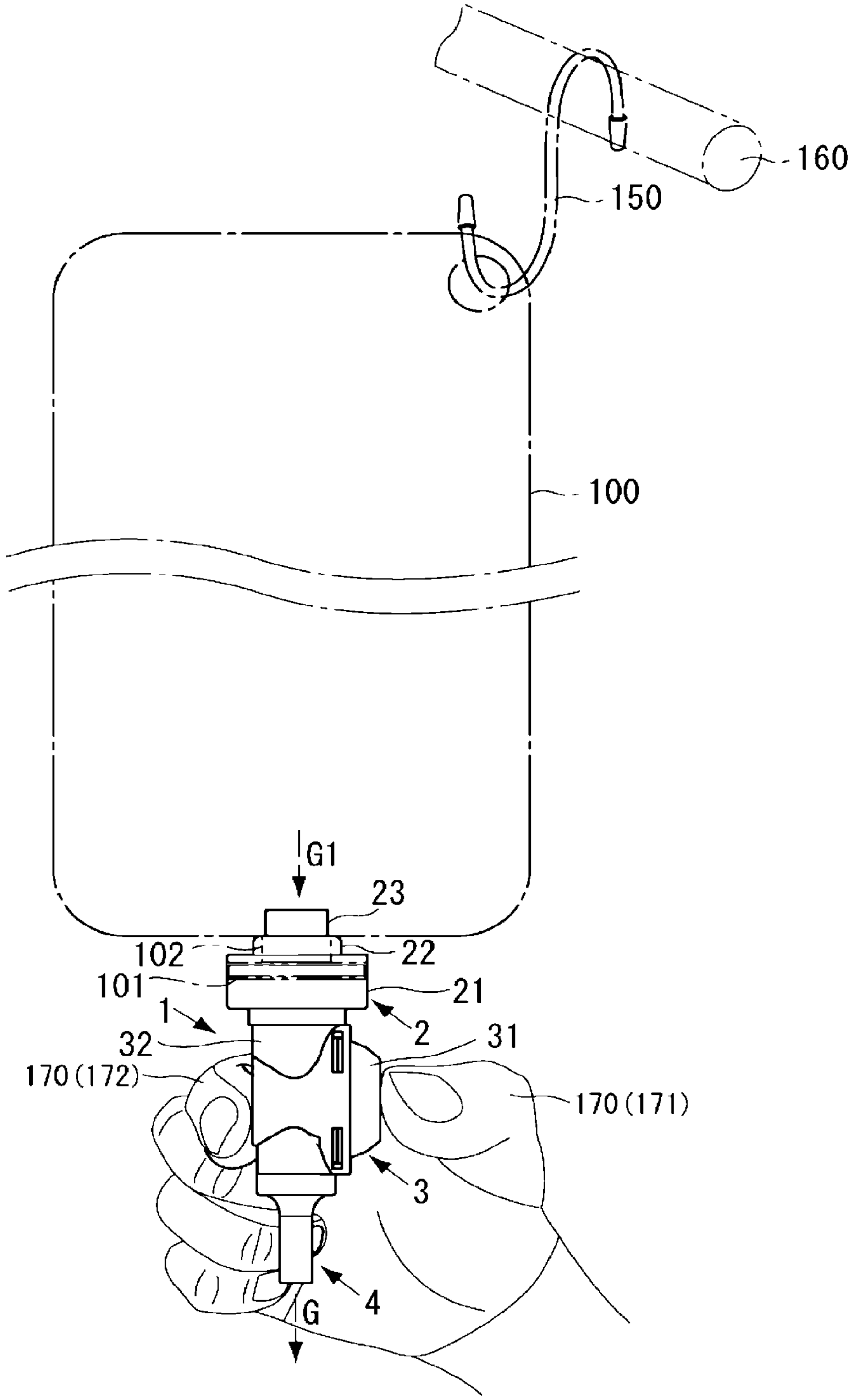
FIG. 4 is a view explaining a usage mode of the dispenser according to the first embodiment.

In the casing 32, a flow passage circular in section that penetrates through the pump portion 3 in the diameter direction Y that is a direction orthogonal to the axial direction X is formed. One end side of the flow passage forms a suction passage 341, and the other end side of the flow passage forms a discharging passage 342. The suction passage 341 and the discharging passage 342 communicate with the pump chamber 30. The cap portion 2 is fitted onto an outer periphery of the suction passage 341. The cap portion 2 includes three cylindrical portions 21, 22, and 23 that have a same center and different diameters. The cylindrical portion 21 has a screw formed on an inner peripheral side thereof and configures a fitting portion that causes the dispenser 1 to be fitted to a liquid accommodation container 100 by being screwed onto a mouth neck portion 101 by being rotated with respect to the mouth neck portion 101 of the liquid accommodation container 100 formed of a film material, as shown in FIG. 4. In the cylindrical portion 22, an outer periphery of the suction passage 341 is inserted inside thereof as shown in FIG. 1 and FIG. 3, and welded by laser or the like to integrate the cap portion 2 and the pump portion 3.

As shown in FIG. 4, the liquid accommodation container 100 is an inverted type that is used by being suspended on a towel hanger 160, for example, with a hook 150. In the dispenser 1 fitted to the liquid accommodation container 100, the nozzle portion 4 is located downward so that a liquid G1, for example a second liquid, accommodated in the container is sucked from an inside of the liquid accommodation container 100 that is located above the pump. When a discharge operation of pinching the dispenser 1 with fingers 170 [for example, a thumb 171 and a forefinger 172] of a hand of a user is performed, a fixed amount of a liquid G, for example a first liquid, in the pump chamber 30 is discharged from the nozzle portion 4, and when the discharge operation is released, the liquid G1 is sucked into the pump chamber 30 from the inside of the liquid accommodation container 100.

In other words, in the present embodiment, an end surface 32*b* configures a pressing support portion that is disposed to face away from the lid body 31, and a discharge operation can be performed by pinching a top portion of the lid body 31 and the end surface 32*b* with the fingers 171 and 172 from lateral sides of the casing 32. The end surface 32*b* to be the pressing support portion is formed as a flat surface.

The cylindrical portion 23 is a part that is inserted into the mouth neck portion 101 and located in the liquid accommodation container 100 when the dispenser 1 is fitted to the liquid accommodation container 100, and as shown in FIG. 1 and FIG. 3, an inside thereof is a liquid inflow path 231. In a wall portion 22*a* that is formed in a border between the cylindrical portion 22 and the cylindrical portion 23, a suction port 232 that communicates with the liquid inflow path 231 and the suction passage 341 is formed.

Inside the cylindrical portion 22, a suction valve 5 is provided as shown in FIG. 1. The suction valve 5 includes a valve body that opens and closes the suction port 232, and a support portion that supports the valve body with spaces in a circumferential direction, and is fitted in a space that is formed between an inner end surface 22*b* of the wall portion 22*a* and an end surface 341*a* of the suction passage 341. In other words, the suction valve 5 is held in a state of being sandwiched by the cap portion 2 and the pump portion 3 from both sides. The suction valve 5 is a resin-molded product. The suction valve 5 is formed to close when internal pressure of the pump chamber 30 increases and shield the suction port 232 to stop a flow of the liquid into the pump chamber 30 from the liquid accommodation container 100. The suction valve 5 is formed to open when the internal pressure of the pump chamber 30 decreases and open the suction port 232 to suck the liquid G1 from the inside of the liquid accommodation container 100.

As shown in FIG. 1 and FIG. 3, the discharging passage 342 that is located at an opposite side to the suction passage 341 is formed to communicate with a cylindrical nozzle fitting portion 343. The nozzle portion 4 is fitted to the nozzle fitting portion 343. The nozzle portion 4 includes a nozzle inner flow path 41 that is formed to penetrate through an inside of the nozzle portion, and a fitting flange 42 for being fitted to the nozzle fitting portion 343. A discharge port 46 is formed in one end portion 41*a* [nozzle tip end 4*a*] of the nozzle inner flow path 41. The other end portion 41*b* of the nozzle inner flow path 41 is formed to communicate with a discharge port 344 that is formed in an end portion of the discharging passage 342. In the fitting flange 42, an annular groove 43 including a step portion 44 therein is formed. The cylindrical nozzle fitting portion 343 is inserted in the groove 43. On an outer peripheral surface of the nozzle fitting portion 343, a projection 45 that is engaged with the step portion 44 is formed. The dispenser 1 is formed so that the nozzle fitting portion 343 is inserted into the groove 43 and the step portion 44 and the projection 45 are engaged with each other, whereby a slip of the nozzle portion 4 is prevented.

Inside the nozzle fitting portion 343, a discharge valve 6 is arranged. The discharge valve 6 includes a valve body that opens and closes the discharge port 344, and a support portion that supports the valve body with spaces in the circumferential direction and is arranged in a space that is formed between the end portion 4*b* of the nozzle portion 4 and an inner end surface 343*a* of the nozzle fitting portion 343. In other words, the discharge valve 6 is held in a state of being sandwiched by the nozzle portion 4 and the pump portion 3 from both sides. The discharge valve 6 is a resin-molded product. The discharge valve 6 is formed to open to open the discharge port 344 when the internal pressure of the pump chamber 30 increases and discharge the liquid in the pump chamber 30 to an outside from the discharge port 46 via the nozzle inner flow path 41. The discharge valve 6 is formed to close to close the discharge port 344 when the internal pressure of the pump chamber 30 decreases and stop a flow of the liquid from the inside of the pump chamber 30 to the nozzle inner flow path 41.

In the dispenser 1, the liquid inflow path 231, the suction port 232, the suction passage 341, the discharging passage 342, the discharge port 344 and the nozzle inner flow path 41 [nozzle portion 4] are arranged in series so that the respective centers are located on a same straight line. In the present embodiment, the straight line is set as a center line Y1 of the nozzle that is orthogonal to the discharge operation direction Xb to the lid body 31. In other words, as shown in FIG. 1, the suction passage 341 and the discharging passage 342 are disposed to face each other via the pump chamber 30.

The lid body 31 is fitted to the casing 32 to cover the opening 33 of the casing 32. The lid body 31 is formed of a material that is elastically deformable. In the lid body 31, a top surface 31*a* that is located on an opposite side to the end surface 32*b* is formed into a substantially flat truncated conical shape, and the lid body 31 has the top surface 31*a* as a flat surface, on a top portion. The top surface 31*a* of the lid body 31 and the end surface 32*b* are formed as planes parallel to each other. The lid body 31 is provided to bulge in a direction protruding outward and shown by an arrow Xa (hereinafter, described as "restoration direction Xa") from the casing 32 before the discharge operation (before deformation). The lid body 31 causes the liquid G in the pump chamber 30 to be discharged from the discharge port 46 by performing a discharge operation that presses the lid body 31 toward the inside of the pump chamber 30 with human fingers 170 (see FIG. 4), for example, to deform the lid body 31 as shown by an arrow Xb. The direction shown by the arrow Xb to press at the time of the discharge operation will be hereinafter referred to as "discharge operation direction Xb". When the discharge operation is released, the lid body 31 is restored to the restoration direction Xa, and sucks the liquid G1 into the pump chamber 30 from the liquid accommodation container 100.

As shown in FIG. 3, an annular flange portion 31*c* that is protruded in the diameter direction Y is formed on an opening side 31*b* of the lid body 31 that is located on an opposite side to the top surface 31*a*. The flange portion 31*c* is inserted into a circular fitting groove 345 that is formed in the end surface 32*a* of the casing 32 concentrically with the opening 33 from an opening 33 side. As shown in FIG. 5, in the flange portion 31*c*, a lip portion 36 capable of being inserted into a slit portion 346 that is formed in a bottom portion 345*c* of the fitting groove 345 is formed. The flange portion 31*c* and the fitting groove 345 are formed so that the lip portion 36 is inserted into the slit portion 346 when the flange portion 31*c* is fitted in the fitting groove 345. Accordingly, as shown in FIG. 1, the dispenser 1 is configured such that the lip portion 36 occupies an engagement state by insertion into the slit portion 346, and thereby prevents rotation in the circumferential direction of the lid body 31.

As shown in FIG. 1 and FIG. 3, between an annular outside inner wall 345*a* of the fitting groove 345, and an outer surface 31*d* of the lid body 31 facing the outside inner wall 345*a* in a state fitted in the fitting groove 345, a ring-shaped stop member 37 is fitted so as to be in a fitted state. Since the stop member 37 is fitted in the fitting groove 345, the lid body 31 has the flange portion 31*c* pressed against the outside inner wall 345*a*, an inside inner wall 345*b* and the bottom portion 345*c* of the fitting groove 345, as shown in FIG. 1. Accordingly, the lid body 31 is fitted to the casing 32 so as not to remove from the annular fitting groove 345 even when the lid body 31 is pressed in the discharge operation direction Xb.

As shown in FIG. 1 and FIG. 3, the dispenser 1 includes a coil spring 7 that urges the lid body 31 toward the restoration direction Xa that is the outside of the casing 32, in the pump portion 3 (pump chamber 30). The coil spring 7 is a compression coil spring, one end 7*a* side thereof is placed on a bottom surface 32*e* of the casing 32, and another end 7*b* side is engaged with a spring receiving portion 38 formed on an inner surface 31*e* of the lid body 31, as shown in FIG. 1. The spring receiving portion 38 includes an annular rib 38*a* that is protruded toward the inside of the pump chamber 30 from the inner surface 3l*e* of the lid body 31. In other words, the bottom surface 32*e* on which the coil spring 7 abuts and the end surface 32*b* to be the pressing support portion are in a positional relationship in which they are in opposite positions. Accordingly, when the discharge operation is performed by pinching the top portion (top surface 31*a*) of the lid body 31 and the end surface 32*b* with the fingers 170 from the lateral sides of the casing 32, forces by the fingers are reliably transmitted to the coil spring 7.

As shown in FIG. 1, in the dispenser 1, a length L from the lid body 31 to the end surface 32*b* to be the pressing support portion is defined. In other words, when an imaginary plane Y2 that passes through the center line Y1 of the nozzle orthogonal to the discharge operation direction Xb, and is perpendicular to the discharge operation direction Xb is set as a reference, and when a length from the imaginary plane Y2 to the top surface 31*a* that is a top portion of the lid body 31 before deformation is set as L1, and a distance from the imaginary plane Y2 to the end surface 32*b* is set as L2, a distance L from the top surface 31*a* to the end surface 32*b* is L1+L2. The distance L is a distance that allows two or three fingers 170 of one hand to pinch the top portion (top surface 31*a*) of the lid body 31 and the end surface 32*b* easily. In the dispenser 1, the distance L1 is set to be longer than the distance L2. This is to ensure a stroke amount that allows the lid body 31 to fully enter the pump chamber 30 and deform, when the discharge operation is performed to the lid body 31. Further, it is preferable that a magnification of the distance L1 is not too large with respect to the distance L2 from a viewpoint of being capable of performing the discharge operation more stably, and, for example, the distance L1 is preferably three times as long as the distance L2 or less, and more preferably 2.5 times as long as the distance L2 or less. A material that is used for the casing 32 is a material with higher rigidity than the material used for the lid body 31, and the casing 32 is formed not to bend earlier than the lid body 31 when the discharge operation is performed to the lid body 31. Note that in FIG. 1, the virtual plane Y2 is described by emphasizing angles with visibility taken into consideration.

In the dispenser 1 according to the present embodiment, the discharge operation is enabled by pinching the top surface 31*a* of the lid body 31 and the end surface 32*b* with fingers as described above. Explaining more specifically, in the dispenser 1 according to the present embodiment, after the dispenser 1 is fitted to the liquid accommodation container 100 as shown in FIG. 4, a thick part of the thumb 171, for example, is placed on the top surface 31*a* of the lid body 31, a thick part of the forefinger 172 or a middle finger is placed on the end surface 32*b* of the casing 32, and the pump portion 3 is held by being pinched from the axial direction X that is a lateral side, as shown in FIG. 5. From this state, the user presses and pushes the lid body 31 in the discharge operation direction Xb against a repulsive force of the coil spring 7. Thereupon, the lid body 31 starts to deform partially toward the inside of the pump chamber 30 by a pressing force being applied to the top surface 31*a* of the lid body 31 because rigidity of the casing 32 is higher than rigidity of the lid body 31. Accordingly, the user can firmly hold the top surface 31*a* and the end surface 32*b* with fingers in an initial stage of the discharge operation.

When the lid body 31 is further pushed in the discharge operation direction Xb in the held state, the lid body 31 greatly bends into the pump chamber 30 as shown in FIG. 6. Thereupon, the capacity of the pump chamber 30 decreases to increase the chamber internal pressure and a flow of the liquid from the suction port 232 is stopped with the suction valve 5, while the discharge valve 6 opens to open the discharge port 344, and a fixed amount of the liquid G in the pump chamber 30 is discharged from the discharge port 46 via the nozzle inner flow path 41.

When the user releases the fingers 170 from the top surface 31*a* of the lid body 31 and the end surface 32*b* to release the discharge operation, the lid body 31 moves to the restoration direction Xa by the repulsive force of the coil spring 7, and changes to be restored to an original shape before deformation. Accordingly, the internal pressure of the pump portion 3 is reduced, so that the discharge valve 6 is closed to close the discharge port 344, the suction valve 5 opens to open the suction port 232 and a fixed amount of the liquid G1 in the liquid accommodation container 100 is sucked into the pump portion 3 via the suction port 232 and the suction passage 341.

In this way, according to the dispenser 1, the pressing support portion that is disposed to face away from a top surface 31*a* of the lid body 31 is included, and the discharge operation is possible by pinching the top portion (top surface 31*a*) of the lid body 31 and the end surface 32*b* to be the pressing support portion with the fingers 170 from the lateral sides of the casing 32. Accordingly, a positional deviation of the fingers 170 at the time of the discharge operation hardly occurs, and the discharge operation that pushes the lid body 31 into the pump chamber 30 can be easily and stably performed. In the dispenser 1, two fingers of one hand are moved from the direction that intersects the axial direction X, and can be faced to the top portion (top surface 31*a*) of the lid body 31 and the end surface 32*b* to be the pressing support portion. A direction in which the pressure is applied to the top portion (top surface 31a) of the lid body 31 and the end surface 32b to be the pressing support portion by pinching the top portion and the end surface 32b with the two fingers is the direction along the axial direction X described above.

In order to pinch the dispenser 1 with the fingers from the lateral sides of the casing 32, the top portion (top surface 31a) of the lid body 31 and the end surface 32b to be the pressing support portion are preferably disposed so as to face away from each other in a horizontal direction, in a state where the dispenser 1 is fitted to the liquid accommodation container 100 in an upright or inverted state.

Further, when the center line Y1 extending in the diameter direction Y that is the direction orthogonal to the discharge operation direction Xb to the lid body 31, and passing through the inside of the pump chamber 30 is set as the reference, and when a length from the center line Y1 to the top surface 31a of the lid body 31 is set as L1, and the distance from the center line Y1 to the end surface 32b to be the pressing support portion is set as L2, L1>L2 is established, so that it is possible to provide the dispenser that easily ensures a stroke amount (deformation amount) of the lid body 31 into the pump chamber 30, can discharge a liquid with a targeted discharge amount, and can perform a favorable discharge operation.

The dispenser 1 is a compact dispenser designed on the assumption that the amount of liquid discharged by one discharge operation is about several milliliters. Showing specific dimensions as an example, a diameter R of the lid body 31 is 23.27 mm, L1 is 14.85 mm, and L2 is 7.85 mm. The diameter R of the lid body 31 is a distance between the outer surfaces 31d of parts facing each other of the lid body 31 in the state where the lid body 31 is fitted to the casing 32. As a material used for the lid body 31, for example, an elastomer, a silicone, and NBR are cited. As a material used for the casing 32, a resin material such as PP (polypropylene), and PE (polyethylene) can be cited. According to the configuration of the dispenser 1 with the dimensions and materials as above, a positional deviation of the fingers does not occur when the lid body 31 is pinched with fingers and is pressed in the discharge operation direction Xb, and the discharge operation to the lid body 31 can be performed favorably.

From a viewpoint of easiness of pinching the top surface 31a of the lid body 31 and the end surface 32b, the distance L is preferably equal to or more than 5 mm, more preferably equal to or more than 10 mm, preferably equal to or less than 40 mm, and more preferably equal to or less than 30 mm, preferably 5 mm or more and 40 mm or less, and more preferably 10 mm or more and 30 mm or less.

Second Embodiment

A dispenser 1A according to a second embodiment of the present invention will be described with use of FIG. 7 to FIG. 11. Note that hereinafter, explanation will be made by assigning the same reference signs to the same functions and same members as those in the first embodiment, and properly omitting or simplifying explanation on these members.

Figure 7:
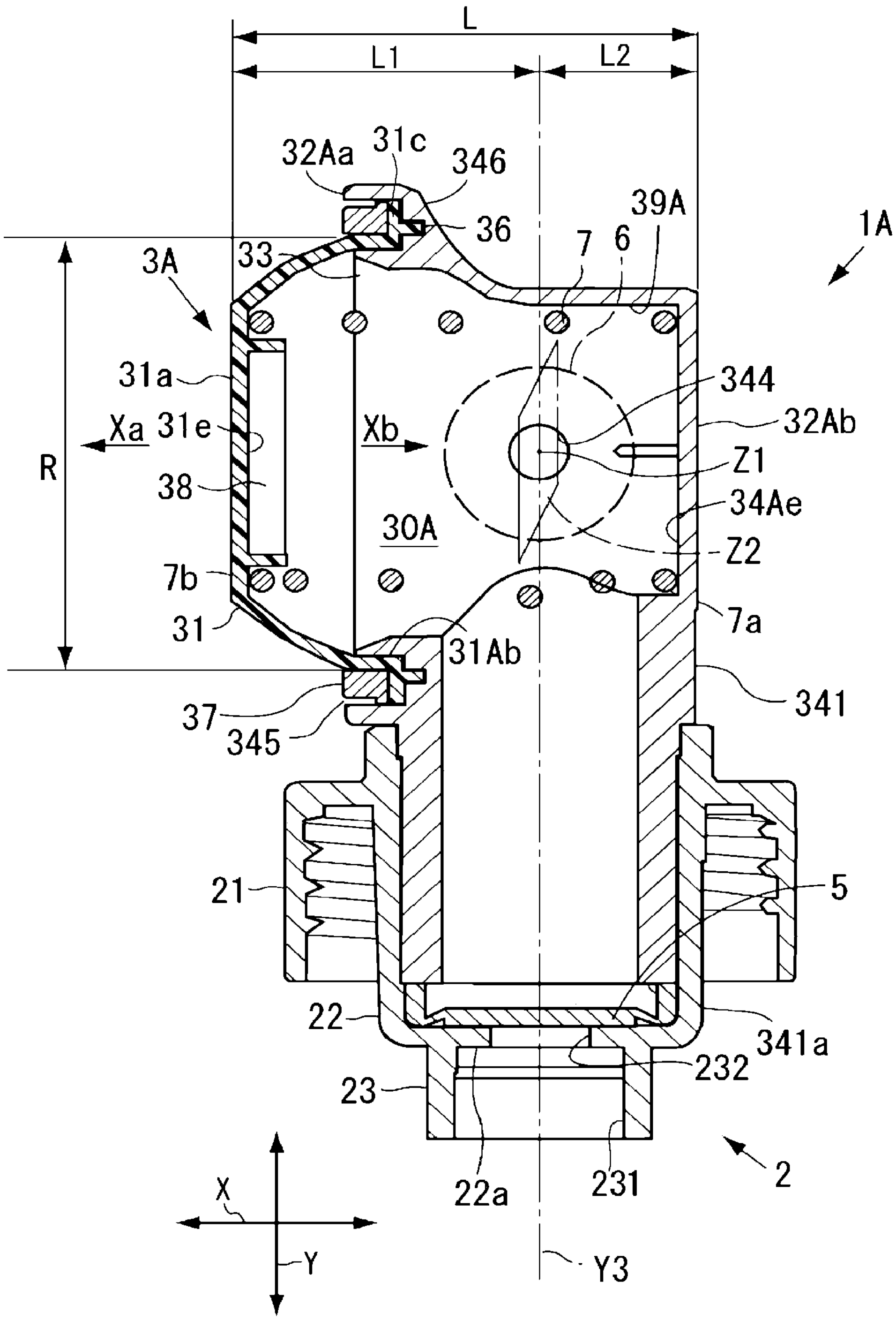
FIG. 7 is a sectional view along line A-A in FIG. 9, explaining a configuration and a state before a discharge operation of a dispenser according to a second embodiment of the present invention.
Figure 8:
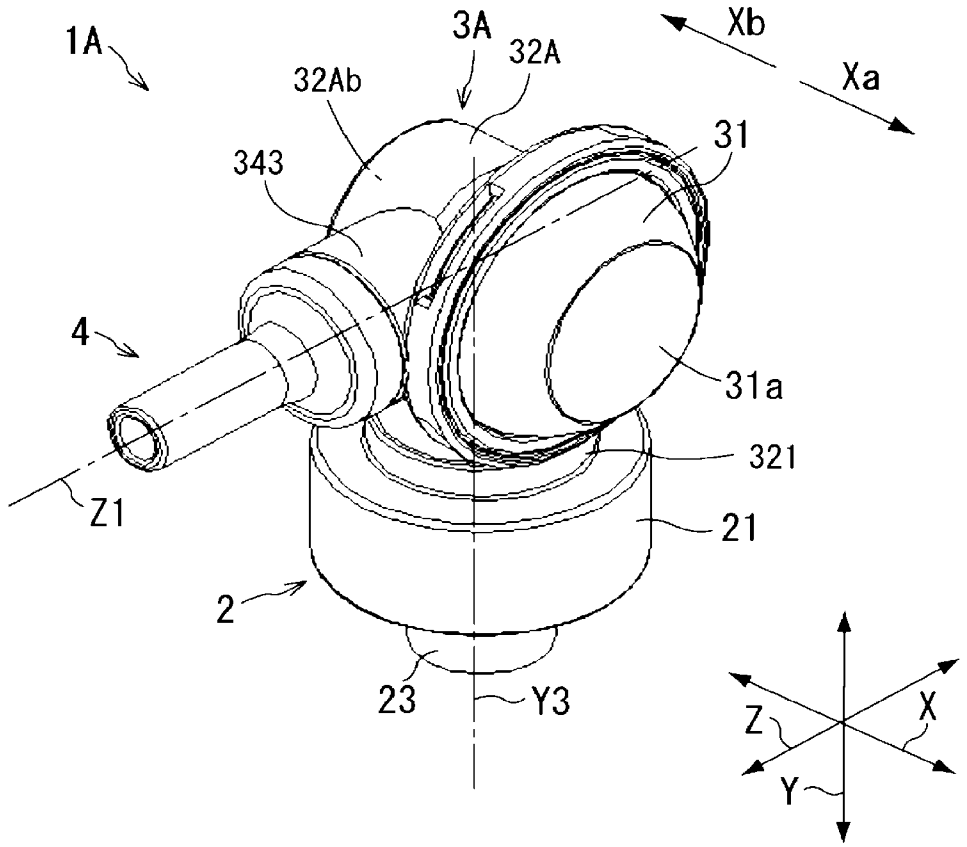
FIG. 8 is a perspective view explaining the configuration of the dispenser according to the second embodiment.
Figure 9:
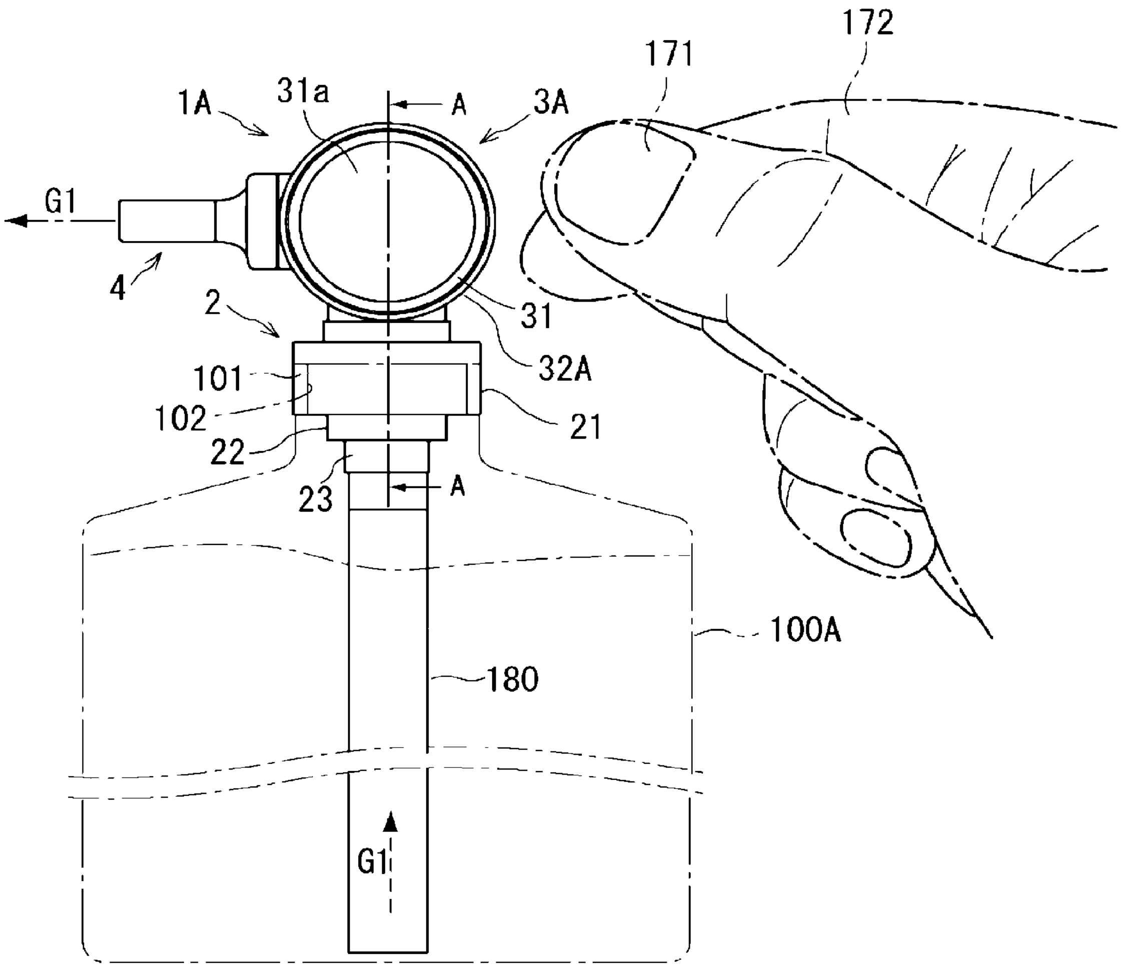
FIG. 9 is a view explaining a usage mode of the dispenser according to the second embodiment.

The dispenser 1A according to the second embodiment includes a cap portion 2, a pump portion 3A, and a nozzle portion 4 as shown in FIG. 7, FIG. 8, and FIG. 9. As for these members, in the dispenser 1A, the cap portion 2 and the nozzle portion 4 are arranged in a direction orthogonal to the pump portion 3A, and are fitted to a casing 32A configuring the pump portion 3A. As shown in FIG. 9, the dispenser 1A is used by being fitted to an upper portion of a liquid accommodation container 100A by being screwed onto a mouth neck portion 101 by rotating a cylindrical portion 21 of the cap portion 2 with respect to the mouth neck portion 101 that is formed on the upper portion of the self-supporting liquid accommodation container 100A.

As shown FIG. 7, in the dispenser 1A, a lid body 31 is fitted to cover an opening 33 that is formed in an upper portion of the casing 32A. In the pump portion 3A, a space enclosed by the lid body 31 and the casing 32A is formed as a pump chamber 30A. In the dispenser 1A, a fixed amount of liquid in the pump chamber 30A is discharged from the nozzle portion 4 (see FIG. 8) by performing a discharge operation that presses the lid body 31 in a discharge operation direction Xb to a right part from a left part in the drawing by pinching the lid body 31 and the end surface 32Ab to be a pressing support portion of the casing 32A with fingers 170 (see FIG. 9). The dispenser 1A is a so-called pump dispenser in which a liquid is sucked into the pump chamber 30A from an inside of the liquid accommodation container 100A as shown in FIG. 9 by releasing the discharge operation by releasing the fingers 170 that pinches the dispenser 1A. Here, an operation of a user pushing the lid body 31 leftward by pinching the lid body 31 of the pump portion 3A and the end surface 32Ab with the fingers 170 of a hand is referred to as the discharge operation.

A difference between the pump portion 3 and the pump portion 3A is a shape of the casing 32A. As shown in FIG. 7, in the cylindrical casing 32A, a suction passage 341 is formed in a lower portion thereof with an end surface 341a facing downward. As shown in FIG. 8, in the casing 32A, a discharging passage 342 is formed to extend in a discharge direction Z orthogonal to the discharge operation direction X. In other words, the casing 32A forms an L-shape in section. The cap portion 2 is integrated with the pump portion 3A by inserting the suction passage 341 into the cylindrical portion 22. A lifting pipe 180 that is inserted into the liquid accommodation container 100A is connected to a cylindrical portion 23 as shown in FIG. 9, so that the dispenser 1A can draw up a liquid in the container from a lower part of the container when the dispenser 1A is fitted to the liquid accommodation container 100A.

As shown in FIG. 7, a suction port 232 that is formed in a wall portion 22a in a border of the cylindrical portion 22 and the cylindrical portion 23 communicates with a liquid inflow path 231 and the suction passage 341 that extend in a diameter direction Y, and is opened and closed by a suction valve 5 arranged between the cylindrical portion 22 and the suction passage 341. The discharging passage 342 extending in the discharge direction Z is formed to communicate with a nozzle inner flow path 41 of the nozzle portion 4 that is fitted to a nozzle fitting portion 343 via a discharge port 344. Between the discharging passage 342 and the nozzle portion 4, a discharge valve 6 that opens and closes the discharge port 344 is arranged.

In the dispenser 1A, the liquid inflow path 231, the suction port 232, the suction valve 5, and the suction passage 341 are arranged so that centers thereof are located on a center line Y3 that extends in the diameter direction Y and passes through an inside of the pump chamber 30A. In the dispenser 1A, the discharging passage 342, the discharge valve 6, and the nozzle inner flow path 41 are arranged so that centers thereof are located on a center line Z1 of the nozzle that extends in the discharge direction Z. The end surface 32Ab is formed as a flat surface. The center line Y3 and the center line Z1 are disposed to face the lid body 31, and are orthogonal to the end surface 32Ab that configures the pressing support portion that allows the discharge operation by being pinched with the fingers 170 from the lateral side of the casing 32A together with the lid body 31. The center line Y3 and the center line Z1 pass through the inside of the pump chamber 30A, and are at a same distance from the end surface 32Ab.

Figure 10:
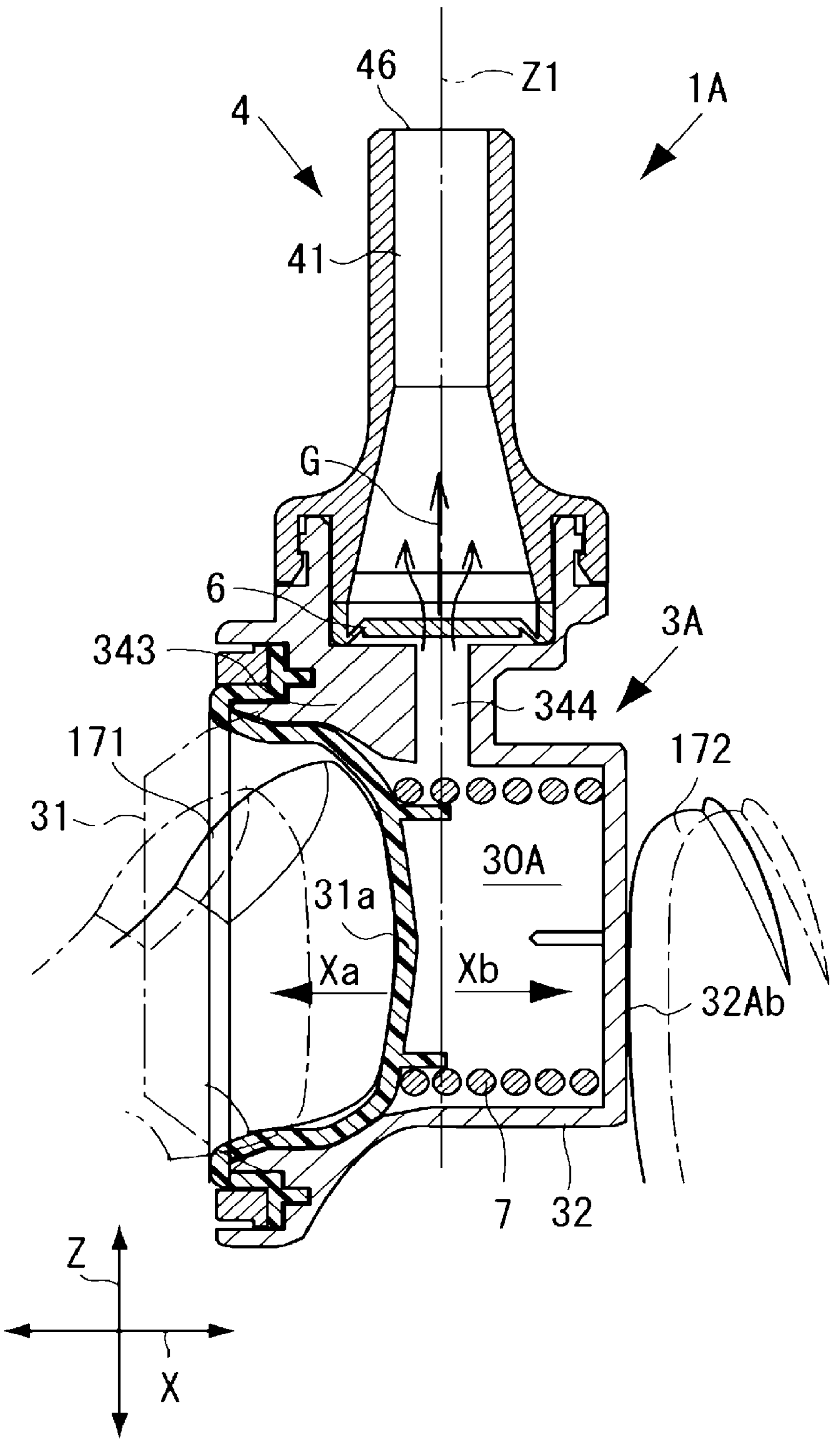
FIG. 10 is a sectional view showing a state on a discharge valve side after the discharge operation of the dispenser according to the second embodiment.
Figure 11:
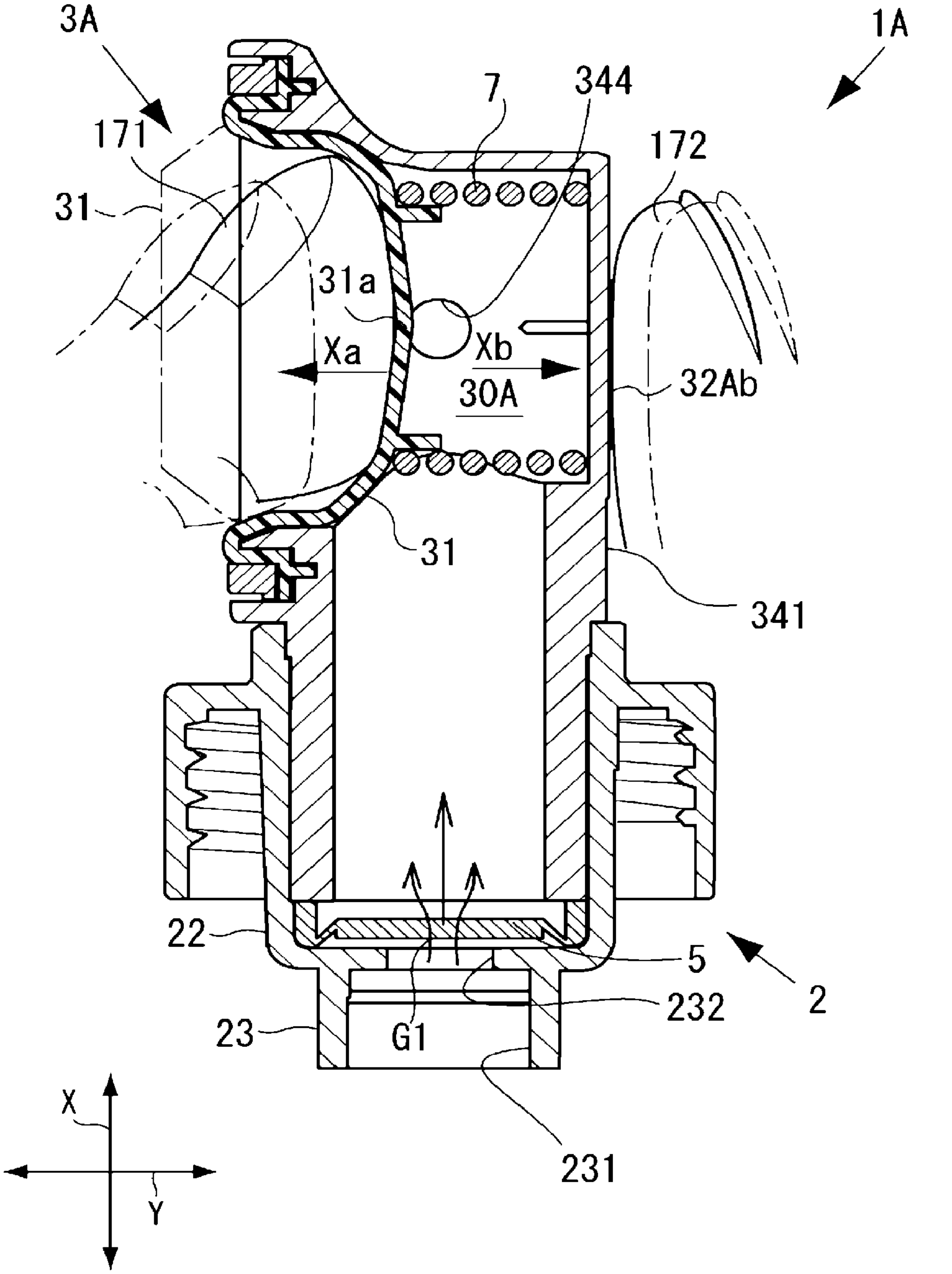
FIG. 11 is a sectional view showing a state on a suction valve side after the discharge operation of the dispenser according to the second embodiment.

The lid body 31 is formed of an elastically deformable material as in the first embodiment and is provided to bulge in a restoration direction Xa from the casing 32A before a discharge operation (before deformation). The lid body 31 causes a liquid inside the pump chamber 30A to be discharged to the outside from a discharge port 46 of the nozzle portion 4 by performing a discharge operation that presses and deforms the lid body 31 to the discharge operation direction Xb with the human fingers 170, as shown in FIG. 10 and FIG. 11. The lid body 31 draws up the liquid G1 from the liquid accommodation container 100A to cause the liquid to flow into the pump chamber 30A as shown in FIG. 9 and FIG. 11, when the pinching fingers 170 are released and the discharge operation is released.

A flange portion 31*c* that is formed on an opening side 31*b* of the lid body 31 is inserted into a circular fitting groove 345 that is formed in the casing 32A concentrically with the opening 33 from an opening 33 side. The lid body 31 is fixed to the casing 32A so that the lid body 31 is not removed from the annular fitting groove 345 even when the lid body 31 is pressed in the discharge operation direction Xb, by a ring-shaped stop member 37 being fitted in the fitting groove 345 in a state where the flange portion 31*c* is inserted in the fitting groove 345.

In the flange portion 31*c* and the fitting groove 345, a lip portion 36 and a slit portion 346 are formed as shown in FIG. 7, as in the first embodiment. The lip portion 36 is inserted into the slit portion 346 when the flange portion 31*c* is fitted in the fitting groove 345, whereby rotation in a circumferential direction of the lid body 31 is prevented.

The dispenser 1A includes a coil spring 7 that urges the lid body 31 to the restoration direction Xa that is outside of the casing 32A, in the pump portion 3A (pump chamber 30A). In the coil spring 7, one end 7*a* side thereof is placed on a bottom surface 32Ae of the casing 32A, and another end 7*b* side is engaged with a spring receiving portion 38 formed on an inner surface 31*e* of the lid body 31.

In the dispenser 1A, a length La from the lid body 31 to the end surface 32Ab to be the pressing support portion is also defined. In other words, when an imaginary plane Z2 that passes through the nozzle center line Z1 orthogonal to the discharge operation direction Xb, and is perpendicular to the discharge operation direction Xb is set as a reference, and when a length from the imaginary plane Z2 to a top surface 31*a* to be a top portion of the lid body 31 before deformation is set as L1, and a distance from the imaginary plane Z2 to the end surface 32Ab is set as L2, the distance La from the top surface 31*a* to the end surface 32Ab is L1+L2. The distance La is a distance that allows two or three fingers 170 of one hand to pinch the top surface 31*a* of the lid body 31 and the end surface 32Ab. In the dispenser 1A, the distance L1 is set to be longer than the distance L2. This is to ensure a stroke amount that allows the lid body 31 to fully enter the pump chamber 30A and deform when the discharge operation is performed to the lid body 31. As for the material that is used for the casing 32A, a material with higher rigidity than the material used for the lid body 31 is used, and the casing 32A is formed so as not to bend earlier than the lid body 31 when the discharge operation is performed to the lid body 31. Note that in FIG. 7, the imaginary plane Z2 is illustrated with angles emphasized with visibility taken into consideration.

After the dispenser 1A according to the present embodiment is fitted to the liquid accommodation container 100A as shown in FIG. 9, the pump portion 3A is held by being pinched from the axial direction X with a thick part of a thumb 171 placed on the top surface 31*a* of the lid body 31, and a thick part of a forefinger 172 or a middle finger placed on the end surface 32Ab of the casing 32A, as shown in FIG. 10. From this state, the user presses and pushes the lid body 31 in the discharge operation direction Xb against a repulsive force of the coil spring 7. Thereupon, since rigidity of the casing 32A is formed to be larger than rigidity of the lid body 31, the lid body 31 starts to deform partially toward the inside of the pump chamber 30A by a pressing force being applied to the top surface 31*a*. Accordingly, the user can firmly hold the top surface 31*a* and the end surface 32Ab with fingers in an early stage of the discharge operation.

When the lid body 31 is further pushed in the discharge operation direction Xb in the held state, the lid body 31 greatly bends into the pump chamber 30A. Thereupon, a capacity of the pump chamber 30A decreases to increase the chamber internal pressure to stop a flow of the liquid from the suction port 232 with the suction valve 5, whereas the discharge valve 6 opens to open the discharge port 344 and a fixed amount of the liquid G in the pump chamber 30A is discharged from the discharge port 46 via the nozzle inner flow path 41.

When the user releases the fingers from the lid body 31 and the end surface 32*b* to release the discharge operation, the lid body 31 moves toward the restoration direction Xa by the repulsive force of the coil spring 7, and changes to be restored to an original shape before deformation. As a result, the internal pressure of the pump portion 3A decreases, so that the discharge valve 6 is closed to close the discharge port 344, whereas the suction valve 5 is opened to open the suction port 232, and a fixed amount of the liquid G1 in the liquid accommodation container 100A is sucked into the pump portion 3A via the suction port 232 and the suction passage 341, as shown in FIG. 11.

As above, according to the dispenser 1A, the end surface 32Ab that is disposed to face away from the lid body 31, and is to be the pressing support portion that enables the discharge operation by being pinched with fingers from lateral sides of the casing 32A together with the lid body 31 is included, so that the discharge operation is enabled by pinching the lid body 31 and the end surface 32Ab together with the fingers 170 from the lateral sides (the axial direction X intersecting the diameter direction Y in a same plane) of the casing 32A. Accordingly, a positional deviation of the fingers 170 at the time of discharge operation does not occur, so that the discharge operation of deforming the lid body 31 into the pump chamber 30A becomes stable, and the dispenser 1A that can perform a favorable discharge operation can be provided.

Since L1>L2 is established when the length from the imaginary plane Z2 to the top surface 31*a* of the lid body 31 is set as L1, and the distance from the imaginary plane Z2 to the end surface 32Ab to be the pressing support portion is set as L2 with the imaginary plane Z2 that is orthogonal to the discharge operation direction Xb to the lid body 31 and passes through the center line Z1 of the nozzle as the reference, it is possible to provide the dispenser 1A that easily ensures the stroke amount (deformation amount) of the lid body 31 into the pump chamber 30A, can discharge the liquid with the targeted discharge amount, and can perform a favorable discharge operation.

When in the dispenser 1A, the diameter R, the distance L1, and the distance L2 of the lid body 31 are set as in the dispenser 1, and the material used for the lid body 31 is also made the same, the discharge operation to the lid body 31 can be performed favorably without a positional deviation of the fingers when pressing the lid body 31 in the discharge operation direction Xb by pinching the lid body 31 with the fingers.

The dispenser 1A is a compact dispenser designed on the assumption that the amount of liquid discharged by one discharge operation is about several milliliters. Showing specific dimensions as an example, a diameter R of the lid body 31 is 23.27 mm, L1 is 14.85 mm, and L2 is 7.85 mm. The diameter R of the lid body 31 is a distance between the outer surfaces 31*d* of parts facing each other of the lid body 31 in the state where the lid body 31 is fitted to the casing 32A.

According to the configuration of the dispenser 1A including the lid body 31 with the dimensions and materials as above, a positional deviation of the fingers does not occur when the lid body 31 is pinched with fingers and pressed in the discharge operation direction Xb, and the discharge operation to the lid body 31 can be favorably performed.

Although the preferable embodiments of the present invention are described thus far, the present invention is not limited to these specific embodiments, and various modifications and changes can be made within the scope of the gist of the present invention described in the claims unless specially limited in the aforementioned explanation.

In the dispensers 1 and 1A, the end surfaces 32*b* and 32Ab of the casings each located on the opposite side to the lid body 31 are made flat surfaces and used as the pressing support portions but may be substantially flat surfaces. In other words, the end surfaces 32*b* and 32Ab may have curved surfaces, as long as radiuses of curvature thereof are larger than that of the discharge port 344. Further, in the dispensers 1 and 1A, depressed and projected portions extending in the diameter direction Y may be formed on the end surfaces 32*b* and 32Ab and used as the pressing support portions. Alternatively, the end surfaces 32*b* and 32Ab may be formed into curved surfaces recessed toward the pump chambers 30 and 30A and used as the pressing support portions. Forming the pressing support portions as the depressed and projected portions or the curved surfaces like them is preferable, because the pressing support portions hardly slip and can be firmly held when being pinched with the fingers 170.

Concerning the aforementioned embodiments, the present invention further discloses the following dispensers.

<1>

A dispenser in which a pump chamber is formed by a body including a depression, and a lid body covering an opening of the body, a liquid in the pump chamber is discharged from a nozzle portion by performing a discharge operation that presses the lid body to an inside of the pump chamber to deform the lid body, and a liquid is caused to flow into the pump chamber by releasing the discharge operation, comprising:

a pressing support portion that is disposed to face away from a top surface of the lid body, wherein a discharge operation is performed by pinching a top portion of the lid body and the pressing support portion with fingers from lateral sides of the body.

<2>

The dispenser as set forth in clause <1>, wherein a distance from the pressing support portion to the top portion of the lid body is 5 mm or more and less than 30 mm.

<3>

The dispenser as set forth in clause <1>, wherein when an imaginary plane that passes through a center line of the nozzle portion, and is perpendicular to a discharge operation direction that is a pressing direction of the lid body when performing the discharge operation is set as a reference, and when a distance from the imaginary plane to the top portion of the lid body is set as L1, and a distance from the imaginary plane to the pressing support portion is set as L2, L1>L2 is established.

<4>

The dispenser as set forth in any one of clauses <1> to <3>, wherein the lid body is provided to bulge on an opposite side to the body, and includes a substantially flat top surface.

<5>

The dispenser as set forth in any one of clauses <1> to <4>, wherein the pressing support portion is a substantially flat surface.

<6>

The dispenser as set forth in any one of clauses <1> to <4>, wherein a top surface of the lid body and an end surface to be the pressing support portion are arranged to face away from each other in a horizontal direction.

<7>

The dispenser as set forth in any one of clauses <1> to <6>, including a coil spring that urges the lid body to an outside, in the pump chamber.

<8>

The dispenser as set forth in clause <7>, wherein in the coil spring, one end side thereof is placed on a bottom surface of the depression, and the other end side abuts on an inner surface 31*e* of the lid body.

<9>

The dispenser as set forth in clause <8>, wherein the bottom surface on which the coil spring abuts, and the pressing support portion are in opposite positions.

<10>

The dispenser as set forth in any one of clauses <1> to <9>, wherein the body includes a suction passage as a flow passage for a liquid that flows into the pump chamber, and a discharging passage as a flow passage for a liquid that is discharged from the nozzle portion, and the respective suction passage and discharging passage communicate with the pump chamber.

<11>

The dispenser as set forth in clause <10>, wherein respective centers of the suction passage and the discharging passage are arranged in series to be located on a same straight line.

<12>

The dispenser as set forth in clause <10>, wherein the suction passage and the discharging passage are disposed to face each other via the pump chamber.

INDUSTRIAL APPLICABILITY

According to the dispenser of the present invention, a positional deviation of the fingers hardly occurs at the time of the discharge operation, and the discharge operation of pushing the lid body into the pump chamber can be easily and stably performed.

The invention claimed is:

1. A dispenser, comprising:

a pump chamber is formed by a body including a depression and a lid body covering an opening of the body, wherein a first liquid in the pump chamber is discharged from a nozzle portion by performance of a discharge operation that presses the lid body into an inside of the pump chamber to deform the lid body and a second liquid is caused to flow into the pump chamber by release of the discharge operation;

a suction passage having an open end that opens toward the pump chamber; and a pressing support portion that is disposed to face away from a top surface of the lid body, wherein the discharge operation is performed by pinching the top surface of the lid body and the pressing support portion from lateral sides of the body, wherein the suction passage extends along a direction orthogonal to a discharge operation direction of the lid body, the lid body is formed of a material that is elastically deformable, when the lid body is pressed in the discharge operation, the lid body bends into the pump chamber, wherein a part of the lid body is deformable toward the inside of the pump chamber such that, at an inside of the depression, a part of the lid body overlaps with a part of the open end of the suction passage, after the discharge operation is performed, when the open end of the suction passage is viewed from a front direction.

2. The dispenser according to claim 1, wherein a distance from the pressing support portion to the top surface of the lid body is 5 mm or more and less than 30 mm.

3. The dispenser according to claim 1, wherein when an imaginary plane that passes through a center line of the nozzle portion and that is perpendicular to a discharge operation direction that is a pressing direction of the lid body when performing the discharge operation is set as a reference, a distance from the imaginary plane to the top surface of the lid body is set as L1, and a distance from the imaginary plane to the pressing support portion is set as L2, L1>L2 is established.

4. The dispenser according to claim 1, wherein the lid body is provided to bulge with respect to the body, and the lid body includes a flat top surface.

5. The dispenser according to claim 1, wherein the pressing support portion is a flat surface.

6. The dispenser according to claim 1, wherein the top surface of the lid body and an end surface that is the pressing support portion are arranged to face away from each other.

7. The dispenser according to claim 1, further comprising a coil spring in the pump chamber, the coil spring urging the lid body to an outside.

8. The dispenser according to claim 7, wherein one end side of the coil spring is placed on a bottom surface of the depression, and another end side of the coil spring abuts on an inner surface of the lid body.

9. The dispenser according to claim 8, wherein the bottom surface on which the coil spring abuts and the pressing support portion face opposite directions.

10. The dispenser according to claim 1, wherein the body includes a suction passage as a flow passage for the second liquid that flows into the pump chamber and a discharging passage as a flow passage for the first liquid that is discharged from the nozzle portion, and the suction passage and discharging passage communicate with the pump chamber.

11. The dispenser according to claim 10, wherein respective centers of the suction passage and the discharging passage are arranged in series and located on a same straight line.

12. The dispenser according to claim 10, wherein the suction passage and the discharging passage are disposed opposite to one another with respect to the pump chamber.

13. The dispenser according to claim 1, wherein a bottom surface of the body faces an inner surface of the lid body that faces the pump chamber, and the pressing support portion is located at an end surface of the body which is an opposite side of the bottom surface of the body.

14. The dispenser according to claim 1, wherein, when the lid body is pressed in the discharge operation, the top surface of the lid body is pressed into the inside of the pump chamber.

15. The dispenser according to claim 1, wherein, when the lid body is pressed in the discharge operation, the top surface of the lid body exists between two surfaces that form the pump chamber and oppose one another.

* * * * *